United States Patent [19]

Hwang

[11] Patent Number: 5,216,651
[45] Date of Patent: Jun. 1, 1993

[54] PICKUP-DRIVE STABILIZING APPARATUS FOR AN OPTICAL DISC PLAYER

[75] Inventor: Yong-ha Hwang, Seoul, Rep. of Korea
[73] Assignee: SamSung Electronics Co., Ltd., Suwon, Rep. of Korea
[21] Appl. No.: 796,595
[22] Filed: Nov. 22, 1991
[30] Foreign Application Priority Data
Jan. 25, 1991 [KR] Rep. of Korea .................. 91-1288
[51] Int. Cl.$^5$ ................................................ G11B 7/00
[52] U.S. Cl. ............................. 369/44.28; 369/44.25; 369/32
[58] Field of Search .............. 369/44.25, 44.27, 44.28, 369/44.29, 32

[56] References Cited

U.S. PATENT DOCUMENTS

| | | | |
|---|---|---|---|
| 5,020,044 | 5/1991 | Shimonou | 369/44.25 |
| 5,050,146 | 9/1991 | Richgels | 369/44.28 |
| 5,095,474 | 3/1992 | Ito et al. | 369/44.25 |
| 5,117,410 | 5/1992 | Akiyama | 369/44.25 |

Primary Examiner—Andrew L. Sniezer
Assistant Examiner—Nabil Hindi
Attorney, Agent, or Firm—Robert E. Bushnell

[57] ABSTRACT

A pickup driving apparatus, and particularly, a pickup-drive stabilizing apparatus for an optical disc player includes: a detector for detecting an inertia of a pickup relative to a movement speed of the pickup, when an instruction occurs to stop driving a sled motor that transversely shifts the pickup at a high speed for high-speed access; and a comparator that determines whether an inertia speed of the pickup has decelerated to within a range stable for tracking control by comparing the output signal of the detector with a preset reference signal and generates an output signal for starting the tracking control. Therefore, the pickup-drive stabilizing apparatus can stabilize the pickup of the optical disc player after performing high-speed information access on an optical disc.

15 Claims, 3 Drawing Sheets

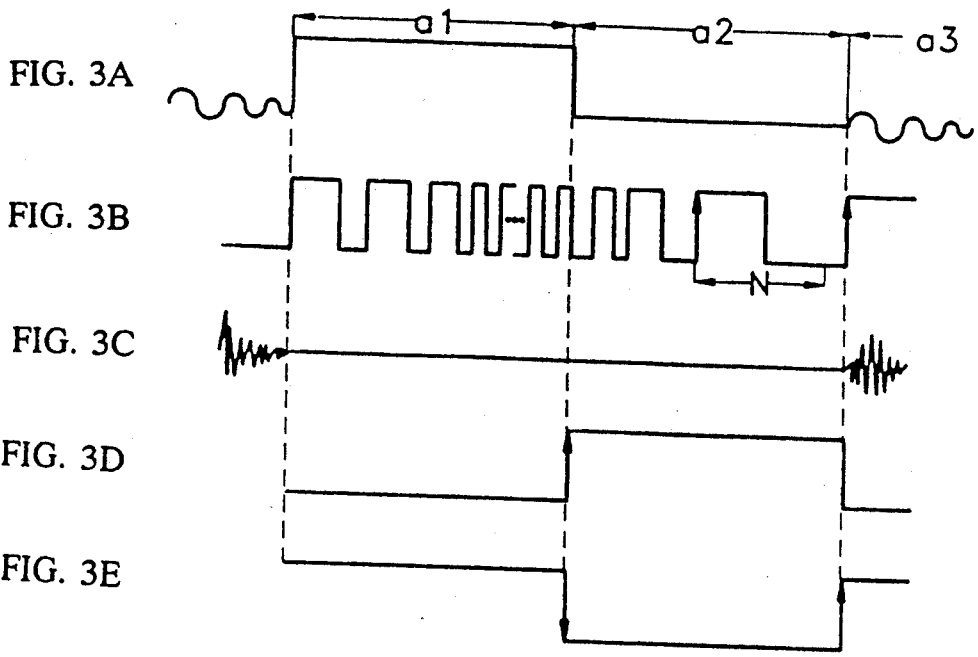
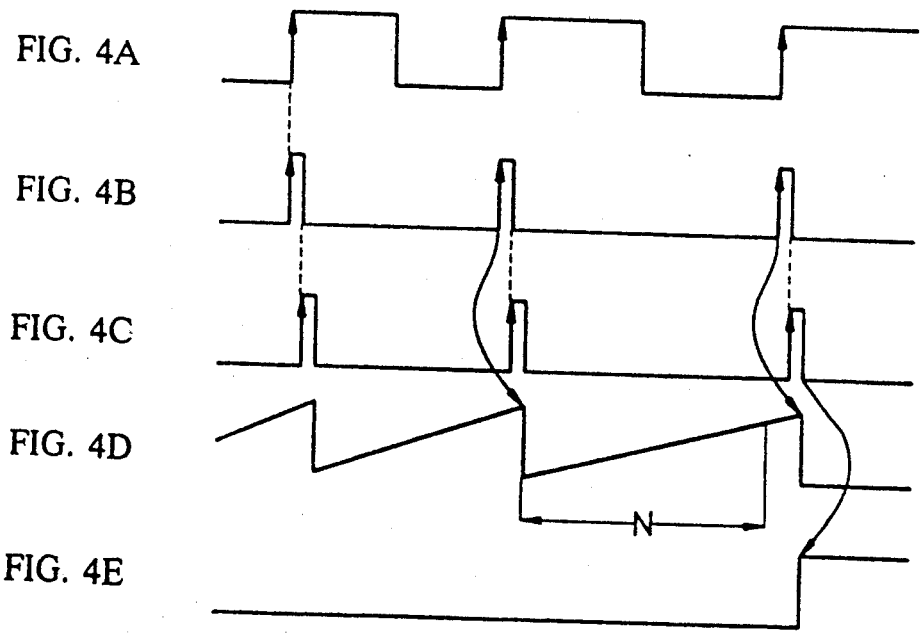

PICKUP-DRIVE STABILIZING APPARATUS FOR AN OPTICAL DISC PLAYER

BACKGROUND OF THE INVENTION

The present invention relates to a pickup driving apparatus in an optical disc player, and particularly to a pickup-drive stabilizing apparatus for stabilizing the tracking of an optical disc player, after carrying out high-speed information access.

An apparatus that records and reproduces information using an optical disc is known as an optical disc player. The term "tracking" applies to an object lens moving along a track of the optical disc having certain information thereon, and the term "high-speed access" refers to the pickup of an optical disc player traversing from one track to another track far removed from the first. The optical disc player shifts the pickup by driving a sled motor to perform the high-speed information access on the optical disc.

In the conventional high-speed information access method, a sled servo driving signal is applied from a microcomputer to control the sled motor. Then, a tracking servo driving signal is applied to control a tracking servo. However, the tracking is very unstable after performing the high-speed access due to the inertia of the pickup. Due to this inertia, the pickup continues to move for a period even after the tracking servo driving signal is applied to control the tracking servo. Therefore, high-speed tracking is performed as soon as the microcomputer supplies the sled servo control signal. A problem thus occurs in that the pickup moves for a period because of the pickup's inertia due to the high-speed access, making the tracking very unstable.

SUMMARY OF THE INVENTION

It is an object of the present invention to provide a pickup-drive stabilizing apparatus which can stabilize tracking after performing high-speed information access on an optical disc.

To achieve the above and other objects, an optical disc player can perform high-speed access while transversely transferring a pickup across the track of an optical disc, using a pickup drive stabilizing apparatus which includes:

detecting means for detecting the inertia movement speed of the pickup, after a drive-stop instruction of a sled motor that transversely shifts the pickup means at a high speed for the high-speed access; and a determining means that determines whether or not the inertia speed of the pickup has decelerated to within a range stable enough for tracking control by comparing the output signal of the detecting means with a preset reference signal, and generates an output signal for starting the tracking control.

BRIEF DESCRIPTION OF THE DRAWINGS

The objects and advantages of the present invention will become more apparent by the following description with reference to accompanying drawings, in which:

FIGS. 3A through 3E show input/output waveforms of the pickup-drive stabilizing apparatus in FIG. 1; and FIGS. 4A through 4E show input/output waveforms of the sled speed detector in FIG. 2.

DETAILED DESCRIPTION OF THE INVENTION

Figure 1:
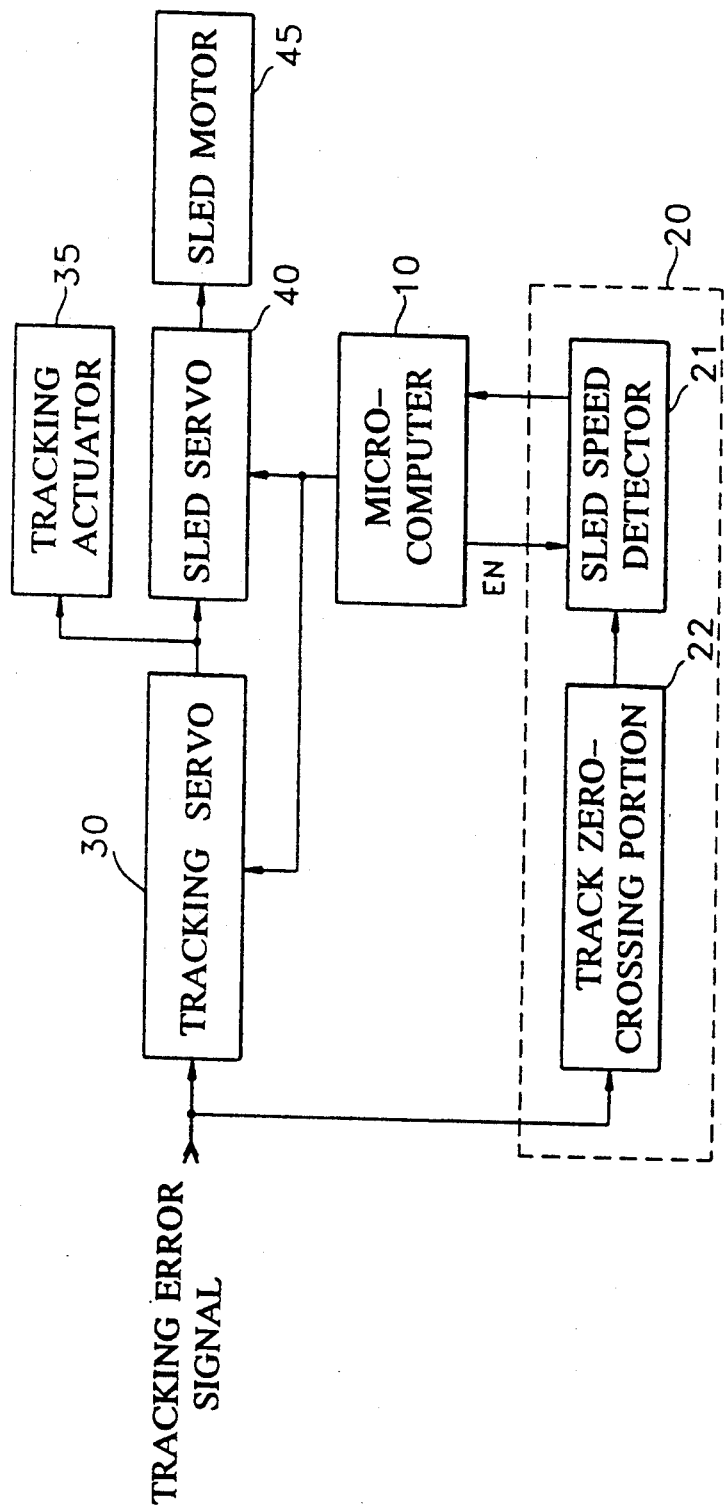
FIG. 1 is a block diagram of a pickup-drive stabilizing apparatus for an optical disc player according to the present invention.

Referring to FIG. 1, the tracking error signal is input to a tracking servo portion 30 and a pickup movement speed detector 20. Outputs of a controller, e.g., microcomputer 10 are connected to the tracking servo portion 30, a sled servo portion 40, and pickup movement speed detector 20. The output of the tracking servo portion 30 is connected to both a tracking actuator 35 and sled servo portion 40 whose output is connected to a sled motor 45. Pickup movement speed detector 20 supplies input to the microcomputer 10, and further breaks down into a track zero-crossing portion 22 and a sled speed detector 21. The tracking error signal feeds track zero crossing portion 22 which is connected to the sled speed detector 21 whose output is the supplied input to the microcomputer 10.

Figure 2:
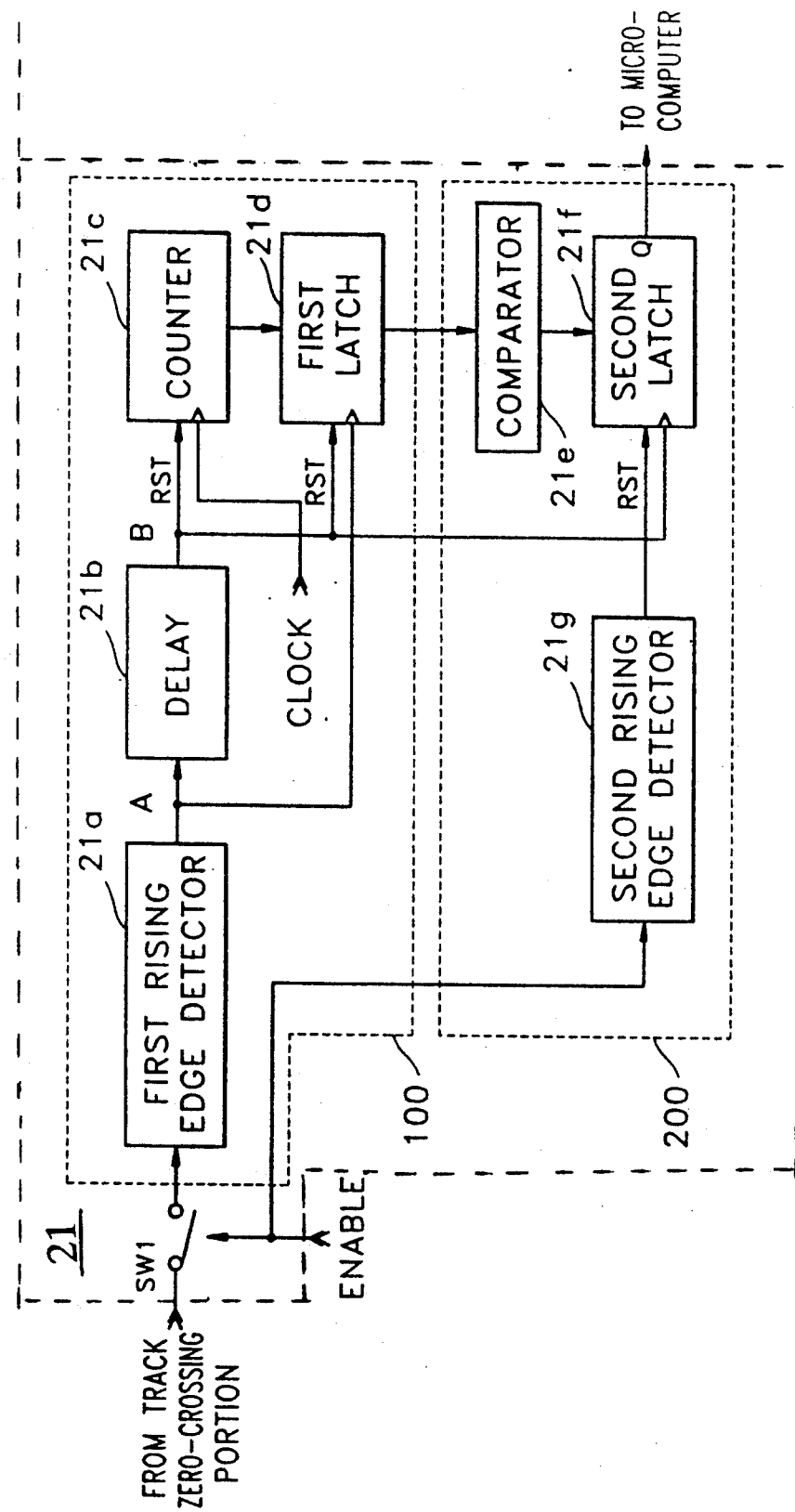
FIG. 2 is a block diagram of the sled speed detector shown in FIG. 1.

FIG. 2 is a detailed block diagram of the sled speed detector 21 shown in FIG. 1.

Referring to FIG. 2, a switch SW1 controlled by an enable signal from the microcomputer 10 is connected between the output of the track zero-crossing portion 22 and a detecting means 100. A determining means 200 is connected to an output of the detecting means 100 which includes a first rising edge detector 21a, a delay circuit 21b, a counter 21c, and a first latch 21d. The input of the first rising edge detector 21a is connected to the output of the switch SW1. The output of the first rising edge detector 21a is connected to both the input of delay circuit 21b and the clock terminal of first latch 21d. The output of delay circuit 21b is connected to the reset terminals of counter 21c and first latch 21d. The output of counter 21c is connected to an input of the first latch 21d. The determining means 200 includes a comparator 21e, a second latch 21f, and a reset signal generator which is second rising edge detector 21g for detecting the rising edge of the enable signal from microcomputer 10. The output of first latch 21d is connected to the input of comparator 21e whose output is connected to the input of second latch 21f. Second rising edge detector 21g also receives the enable signal, while its output is connected to the reset terminal of second latch 21f whose clock terminal is connected to the output of delay circuit 21b. The output of second latch 21f is connected microcomputer 10.

FIGS. 3A to 3E show input/output waveforms of the pickup-drive stabilizing apparatus illustrated in FIG. 1. Here, FIG. 3A shows an output waveform of sled servo portion 40; FIG. 3B shows the output of track zero crossing portion 22; FIG. 3C shows the output of tracking servo portion 30; FIG. 3D shows the enable signal of microcomputer 10 that controls the sled speed detector 21; and FIG. 3E shows the output of sled speed detector 21.

FIG. 4 shows input/output waveforms of the sled speed detector shown in FIG. 2. Here, FIG. 4A shows the inable signal input to first rising edge detector 21a; 4B shows the output waveform of first rising edge detector 21a; 4C shows the output waveform of delay circuit 21b; 4D shows the counted value in counter 21c; and 4E shows the output waveform of second latch 21f.

The operation of the present invention will now be described with reference to FIGS. 1 through 4.

First, when the information on the optical disc is reproduced in the normal state, the microcomputer 10 supplies a normal mode control signal to tracking servo portion 30 and sled servo portion 40, thereby controlling the tracking actuator 35 and the sled motor 45. The tracking servo portion 30 receives a tracking error signal that indicates the position of an object lens on the track of the optical disc, then controls tracking actuator 35. The sled servo portion 40 receives the output of tracking servo portion 30 to control the sled motor 45, thereby moving the object lens of the pickup. That is, during normal reproducing, the position of the object lens is adjusted by the tracking servo portion 30 and the object lens of the pickup is moved by the sled servo portion 40.

On the other hand, when the optical disc player performs high-speed information access on the optical disc, microcomputer 10 outputs a control signal to sled servo portion 40 to make the sled servo portion 40 drive the sled motor, which moves the object lens. The pickup movement speed detector 20 calculates the movement speed of the pickup upon receiving the tracking error signal, then applies a tracking starting signal to the microcomputer 10 when the movement speed of the pickup becomes suitable for tracking.

The pickup movement speed detector 20 is described with reference to FIGS. 3A through 3E. FIG. 3A shows high-speed access operation, where sections a1, a2 and a3 designate the intervals where microcomputer 10 outputs control signal to the sled servo portion 40 to drive the sled motor 45, the microcomputer 10 does not output the control signal, and where microcomputer 10 outputs the control signal to the tracking servo 30 and sled servo portion 40 for driving the tracking actuator 35 and sled motor 45, respectively. When the output of the sled servo portion 40 goes high as in section a1 of FIG. 3A, the output signal of the track zero crossing portion 22 is as illustrated in FIG. 3B. While the sled motor drives the pickup across the tracks, the track zero crossing portion 22 outputs a track zero-crossing signal from the space between tracks according to the reflectivity difference. The track zero-crossing signal is a logic high when the track is present, and is low when the track is not. Here, the sled speed detector 21 receives and counts the output of the track zero crossing portion 22, and then outputs the tracking starting signal to the microcomputer 10 when the speed becomes suitable for tracking. Therefore, the microcomputer 10 outputs the tracking control signal to the tracking servo portion 30 and sled servo portion 40, which in turn drives the tracking actuator 35 and sled motor 45. As a result, the tracking is stabilized. In other words, it is important to drive sled motor 45 and tracking actuator 35 during section a3 and after section a2, which perform tracking after sufficiently eliminating the object lens' inertia of section a2.

Sled speed detector 21 outputs the tracking starting signal to the microcomputer 10 for stabilizing the tracking. To perform high-speed access, the microcomputer 10 supplies a control signal to the sled servo portion 40, and an enable signal to the sled speed detector 21. By the enable signal of the microcomputer 10, the switch SW1 is turned on. The second rising edge detector 21g detects the rising edge of the enable signal, and outputs the detected signal as a reset signal to the second latch 21f. Accordingly, the output of the track zero crossing portion 22 is input to the first rising edge detector 21a. The first rising edge detector 21a detects and outputs the rising edge of the track zero-crossing signal to the delay circuit 21b. Delay circuit 21b outputs a delayed rising edge signal. The waveforms output from the first rising edge detector 21a and the delay circuit 21b are shown in FIGS. 4B and 4C, respectively. FIG. 4A illustrates the input waveform of the first rising edge detector 21a. Thus, the counter 21c receives the waveform shown in FIG. 4C at its reset terminal, and the external clock to the clock terminal. The counter 21c outputs the value counted as illustrated in FIG. 4D by detecting the movement speed of the pickup with the clock signal. The first latch 21d receives and latches the counted value illustrated in FIG. 4D. The counted value that is latched to the first latch 21d is output to the comparator 21e using the signal output from the first rising edge detector 21a as a clock which is input to the clock terminal of the first latch 21d. The comparator 21e outputs a compared signal to the second latch by comparing with the reference value of the comparator 21e. If it is assumed that the counted value to the period of the track zero-crossing signal period corresponding to the movement speed of the pickup is "N" shown in FIG. 4D, the counter 21c continues to count until the period of the track zero-crossing signal exceeds the value "N". Therefore, when the period of the track zero-crossing signal is more than N, the output of second latch 21f becomes a high logic level at the counting point of the next period. The compared signal input to the second latch 21f is output to the microcomputer 10 as a tracking starting signal in accordance with the output signal of the delay circuit 21b which is provided as the clock. The Q output of second latch 21f is supplied to the microcomputer 10, then tracking begins. The output of the sled speed detector 21 is shown in FIG. 4E, and the microcomputer 10 shifts back to the normal mode.

As described above, the present invention is advantageous in that the pickup driving of the optical disc player can be stabilized even after performing high-speed information access on an optical disc.

What is claimed is:

1. An optical disc player for performing high-speed access of one of a plurality of tracks of an optical disc while transversely transferring a pickup across the plurality of tracks, said optical disc player comprising:

means for detecting an inertial speed of said pickup after a sled motor, that transversely transfers said pickup at a high speed to perform high-speed access, receives a signal to stop driving the sled motor; and means for determining whether the inertial speed of said pickup is decelerated within a range stable for controlling tracking by comparing an output signal of said detecting means with a preset reference signal, and for generating a tracking signal to start tracking of the optical disc when the inertial speed is determined to be within said range, wherein said detecting means comprises: a first rising edge detector for producing a first detection signal by detecting a rising edge of a track zero-crossing signal detected by said pickup immediately after said signal to stop driving said sled motor; delay means for producing a delayed signal by delaying the first detection signal for a predetermined time interval; a counter for counting a clock pulse of a predetermined frequency in response to the delayed signal; and a first latch for generating a first latched signal corresponding to the inertial speed of the pickup in response to the first detection signal and the delayed signal.

2. The optical disc player as claimed in claim 1, wherein said determining means comprises:
   a comparator for generating a comparator signal by comparing the output signal of said detecting means with said preset reference signal;
   a second latch for latching the comparator signal in response to the delayed signal input at a clock terminal of the second latch; and
   a reset signal generator producing a reset signal for resetting said second latch immediately after said sled motor receives the signal to stop.

3. An optical disc player comprising:
   tracking servo means for producing a tracking servo signal in response to receiving both a tracking error signal through a pickup, and a tracking control signal;
   a tracking actuator for performing tracking of a plurality of tracks of an optical disc via said pickup in accordance with the tracking servo signal;
   sled servo means for generating a sled servo signal in response to both the tracking servo signal and the tracking control signal in a high-speed access mode;
   a sled motor for transversely transferring said pickup across the plurality of tracks of said optical disc in accordance with the sled servo signal;
   a pickup movement speed detector for generating a tracking starting signal by detecting an inertial speed of said pickup in response to receiving said tracking error signal immediately after finishing the high-speed access mode of said sled servo means, and comparing the tracking starting signal with a preset value corresponding to the inertial speed being decelerated to within a stable tracking range; and
   a controller for supplying said tracking control signal in the high-speed access mode to said sled servo means, and for supplying an enable signal which enables said pickup movement speed detector immediately after completion of the high-speed access mode,
   wherein said pickup movement speed detector comprises: a first rising edge detector for producing a first detection signal by detecting a rising edge of a track zero-crossing signal which is detected by said pickup immediately after a signal to stop driving said sled motor; delay means for producing a delayed signal by delaying the first detection signal for a predetermined time interval; a counter for counting a clock pulse of a predetermined frequency in response to the delayed signal; and a first latch for generating a first latched signal corresponding to the inertial speed of the pickup in response to the first detection signal and the delayed signal.

4. The optical disc player as claimed in claim 3, wherein said pickup movement speed detector further comprises:
   track zero-crossing means for receiving the tracking error signal and outputting the track zero-crossing signal; and
   a sled speed detector for detecting the inertial speed of said pickup by receiving the track zero-crossing signal, for determining whether the inertial speed has decelerated to within said stable tracking range, and for generating the tracking starting signal when the inertial speed is within said range.

5. The optical disc player as claimed in claim 4, wherein said sled speed detector further comprises:
   means for detecting the inertial speed of said pickup immediately after said sled motor, that transversely transfers said pickup at a high speed in the high-speed access mode, receives the signal to stop driving the sled motor; and
   means for determining whether the inertial speed of said pickup has decelerated to within said stable tracking range by comparing an output signal of said detecting means with said preset value, and generating the tracking starting signal to start tracking of the optical disc when the inertial speed is determined to be within said range.

6. The optical disc player as claimed in claim 5, wherein said determining means further comprises:
   a comparator for generating a comparator signal by comparing the output signal of said detecting means with said preset value;
   a second latch for producing the tracking starting signal by latching the comparator signal in response to receiving the delayed signal input at a clock terminal of the second latch; and
   a reset signal generating means for generating a reset signal for resetting said second latch immediately after said sled motor receives the signal to stop.

7. A method of an optical disc player for providing high-speed access of one of a plurality of tracks of an optical disc while transversely transferring a pickup across the plurality of tracks, said method comprising the steps of:
   generating a first latched signal by detecting an inertial speed of the pickup after a sled motor, that transversely transfers said pickup at a high speed to perform high-speed access, receives a signal to stop driving the sled motor; and
   determining whether the inertial speed of said pickup os decelerated within a range stable for controlling tracking by comparing the first latched signal with a preset reference signal, and generating a tracking starting signal to start tracking of the optical disc when the inertial speed is determined to be within said range,
   wherein said generating step comprises: producing a first detection signal by detecting a rising edge of a track zero-crossing signal which is detected by said pickup immediately after said signal to stop driving said sled motor; producing a delayed signal by delaying the first detection signal for a predetermined time interval; counting a clock pulse of a predetermined frequency in response to the delayed signal; and generating the first latched signal corresponding to the inertial speed of the pickup in response to the first detection signal and the delayed signal.

8. the method of claim 7, wherein said determining step comprises:
   generating a comparator signal by comparing the first latched signal with said preset value;
   generating a second latched signal by latching the comparator signal in response to the delayed signal; and
   generating a reset signal immediately after said sled motor receives the signal to stop.

9. A method of an optical disc player comprising:

producing a tracking servo signal in a tracking servo means in response to receiving both a tracking error signal through a pickup, and a tracking control signal;

tracking of a plurality of tracks of an optical disc via a tracking actuator and said pickup in accordance with the tracking servo signal;

generating a sled servo signal in a sled servo means in response to both the tracking servo signal and the tracking control signal in a high-speed access mode;

transversely transferring said pickup across the plurality of tracks of said optical disc via a sled motor in accordance with the sled servo signal;

generating a speed detector signal in a pickup movement speed detector by detecting an inertial speed of said pickup in response to receiving said tracking error signal immediately after completion of the high-speed access mode of said sled servo means;

generating a tracking starting signal when the speed detector signal corresponds to a preset value in a range allowing stable tracking;

supplying from a controller said tracking control signal in the high-speed access mode to said sled servo means;

supplying from the controller an enable signal immediately after completion of the high-speed access mode; and supplying said tracking control signal to said tracking servo means in response to the speed detector signal, wherein said step of generating a speed detector signal comprises the steps of: producing a first detection signal by detecting a rising edge of a track zero-crossing signal which is detected by said pickup immediately after a signal to stop driving said sled motor; producing a delayed signal by delaying the first detection signal for a predetermined time interval; counting a clock pulse of a predetermined frequency in response to the delayed signal; and generating a first latched signal corresponding to the inertial speed of the pickup in response to the first detection signal and the delayed signal.

10. The method of claim 9, wherein said step of generating the speed detector signal further comprises:

receiving the tracking error signal in a track zero-crossing means and outputting the track zero-crossing signal;

detecting the inertial speed of said pickup in a sled speed detector in response to receiving the track zero-crossing signal;

determining whether the inertial speed has decelerated to within a range stable enough for controlling tracking; and generating the tracking starting signal when the inertial speed is within said range.

11. The method of claim 10, wherein said step of determining whether the inertial speed has decelerated, and said step of generating the tracking starting signal, are replaced with the steps of:

detecting the inertial speed of said pickup immediately after said sled motor, that transversely transfers said pickup at a high speed in the high-speed access mode, receives the signal to stop driving the sled motor; and determining whether the inertial speed of said pickup has decelerated to within a range stable enough for controlling tracking by comparing the output signal of said detecting means with a predetermined reference signal;

generating the tracking starting signal to start tracking of the optical when the inertial speed is within said range.

12. The method of claim 11, wherein said step of determining whether the inertial speed of said pickup has decelerated, further comprises:

generating a comparator signal in a comparator by comparing the speed detector signal with said preset value;

generating the tracking starting signal by latching the comparator signal in response to receiving the delayed signal; and generating a reset signal immediately after said sled motor receives the signal to stop.

13. A method of an optical disc player for providing high-speed access of one of a plurality of tracks of an optical disc while transversely transferring a pickup across the plurality of tracks, said method comprising the steps of:

generating a first latched signal by detecting a rising edge of a track zero-crossing signal in response to an inertial speed of the pickup after a sled motor, that transversely transfers said pickup at a high speed to perform high-speed access, receives a signal to stop driving the sled motor, wherein said track zero crossing signal has a first logic state when a track is detected and a second logic state when the track is not detected;

determining whether the inertial speed of said pickup is decelerated within a range stable for controlling tracking by comparing the first latched signal with a preset reference signal; and generating a tracking starting signal to start tracking of the optical disc when the inertial speed is determined to be within said range.

14. An optical disc player for providing high-speed access of a track of an optical disc while transversely transferring a pickup across a plurality of tracks, said optical disc player comprising:

a detector for producing a speed detection signal by detecting one of a first logic state of a track zero-crossing signal corresponding to a presence of said track, and a second logic state of the track zero-crossing signal corresponding to an absence of said track, in response to an inertial speed of said pickup being determined after a sled motor, that transversely transfers said pickup at said high-speed access, receives a signal to stop driving the sled motor; and means for generating a tracking starting signal when the inertial speed of said pickup is decelerated to within a stable tracking range corresponding to a predetermined value, by comparing the speed detection signal with the predetermined value.

15. The optical disc player of claim 14, wherein said detector comprises a detector for detecting a rising edge of the track zero-crossing signal.

* * * * *

UNITED STATES PATENT AND TRADEMARK OFFICE
CERTIFICATE OF CORRECTION

PATENT NO. : 5,216,651
DATED : June 1, 1993
INVENTOR(S) : Yong-Ha Hwang

It is certified that error appears in the above-indentified patent and that said Letters Patent is hereby corrected as shown below:

Column 2,

Line 62,    change "inable" to --enable--;

IN THE CLAIMS

Column 6,

Line 41,    change "os" to --is--.

Signed and Sealed this

Sixth Day of September, 1994

Attest:

BRUCE LEHMAN

Attesting Officer      Commissioner of Patents and Trademarks